US006955379B1

(12) United States Patent
Annerino et al.

(10) Patent No.: US 6,955,379 B1
(45) Date of Patent: Oct. 18, 2005

(54) TORSIONAL MULTI-AXIS CONSTRAINING LATCHING SYSTEM

(75) Inventors: Frank Annerino, Rolling Meadows, IL (US); Sajid Patel, Des Plaines, IL (US); Dan Groebe, Lake Zurich, IL (US)

(73) Assignee: Palm, Inc., Santa Clara, CA (US)

( * ) Notice: Subject to any disclaimer, the term of this patent is extended or adjusted under 35 U.S.C. 154(b) by 1064 days.

(21) Appl. No.: 09/792,806

(22) Filed: Feb. 23, 2001

(51) Int. Cl.⁷ ............................................. E05C 19/06
(52) U.S. Cl. ............................ 292/83; 292/80; 292/81; 292/87
(58) Field of Search ............................. 292/80, 81, 83, 292/87, 91, 116, 117, 120

(56) References Cited

U.S. PATENT DOCUMENTS 5,375,708 A * 12/1994 Wittman .................. 206/315.1
5,484,175 A * 1/1996 Teich et al. .................... 292/80
5,628,533 A * 5/1997 Hill .............................. 292/80
5,700,042 A * 12/1997 Weadon et al. ............... 292/80

* cited by examiner

*Primary Examiner*—Teri Pham Luu
(74) *Attorney, Agent, or Firm*—Wagner, Murabito & Hao LLP

(57) ABSTRACT

A housing for a portable hand held device such as a palmtop computer uses a torsional latching system. The housing is made of front and rear housing laminated housing members. The torsional latch arrangement works in conjunction with a plurality of latch fingers along the edge to attach the front housing laminate with the rear housing laminate. The torsional latch arrangement has a pair of L-shaped latch ribs that engage with a T-shaped latch member by torsion of the L-shaped latch ribs into engagement with pockets adjacent the T-shaped latch member prevent movement of the two housing laminates in relation to one another.

18 Claims, 6 Drawing Sheets

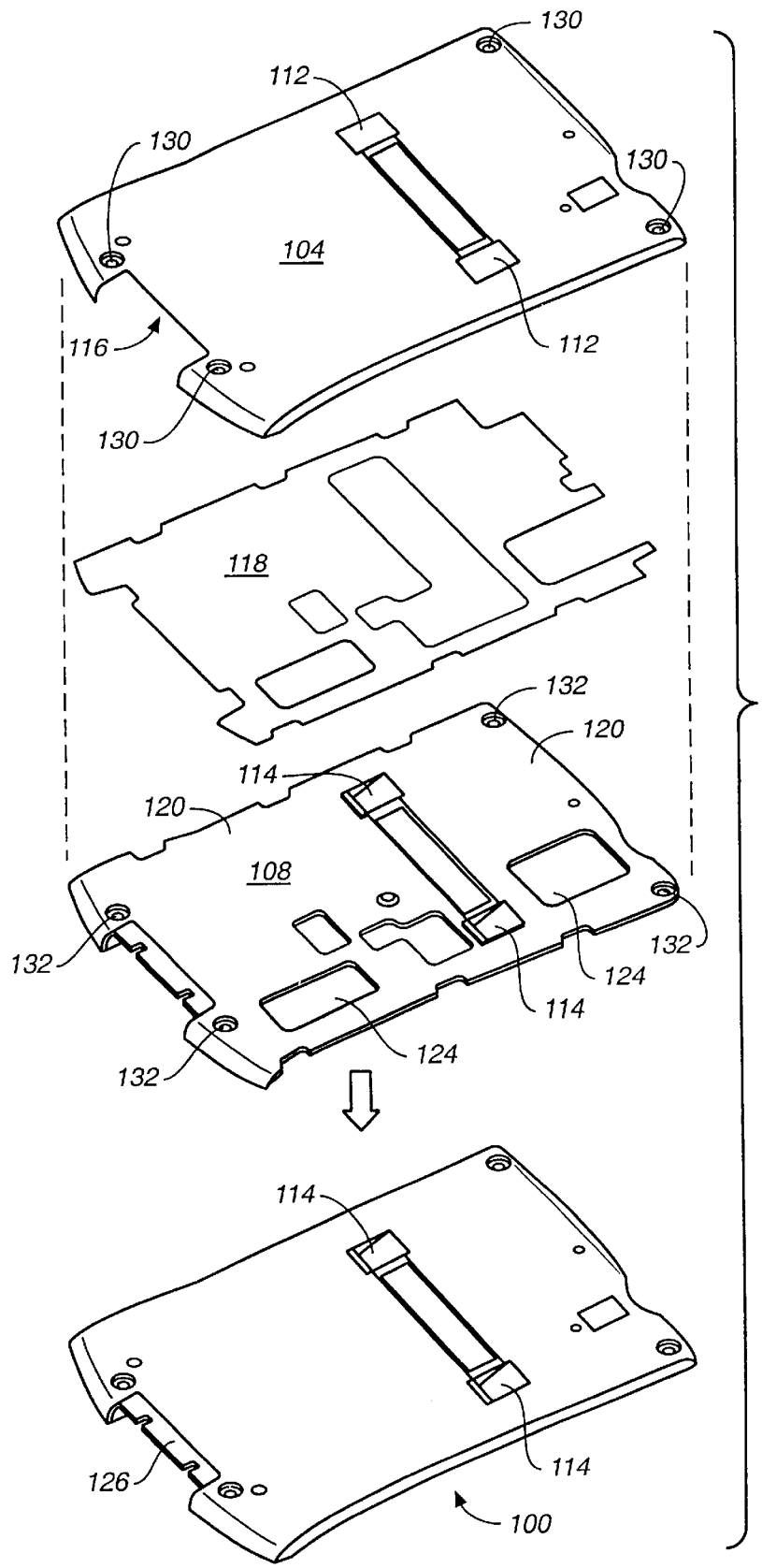
FIG._1

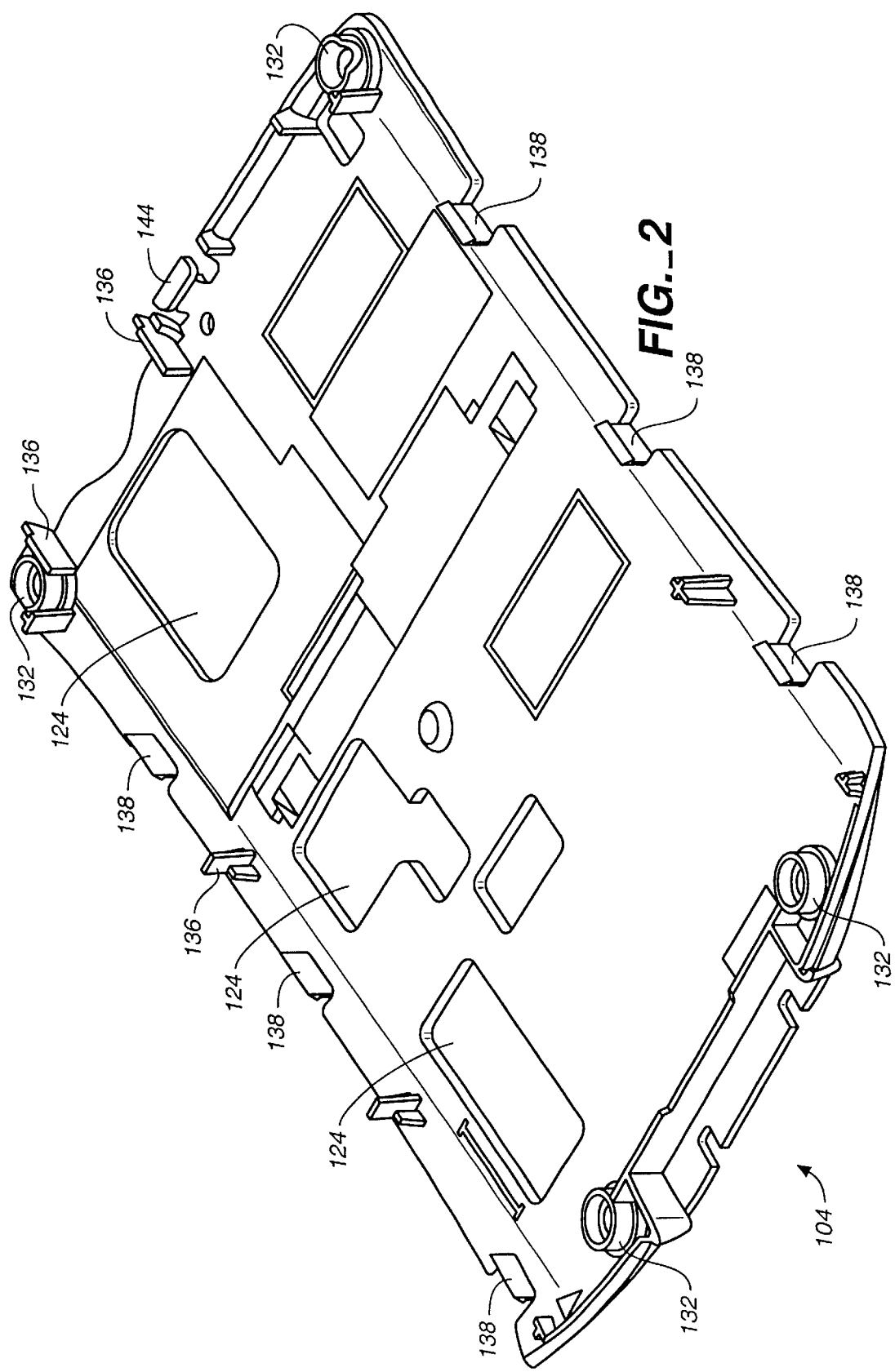
FIG._2

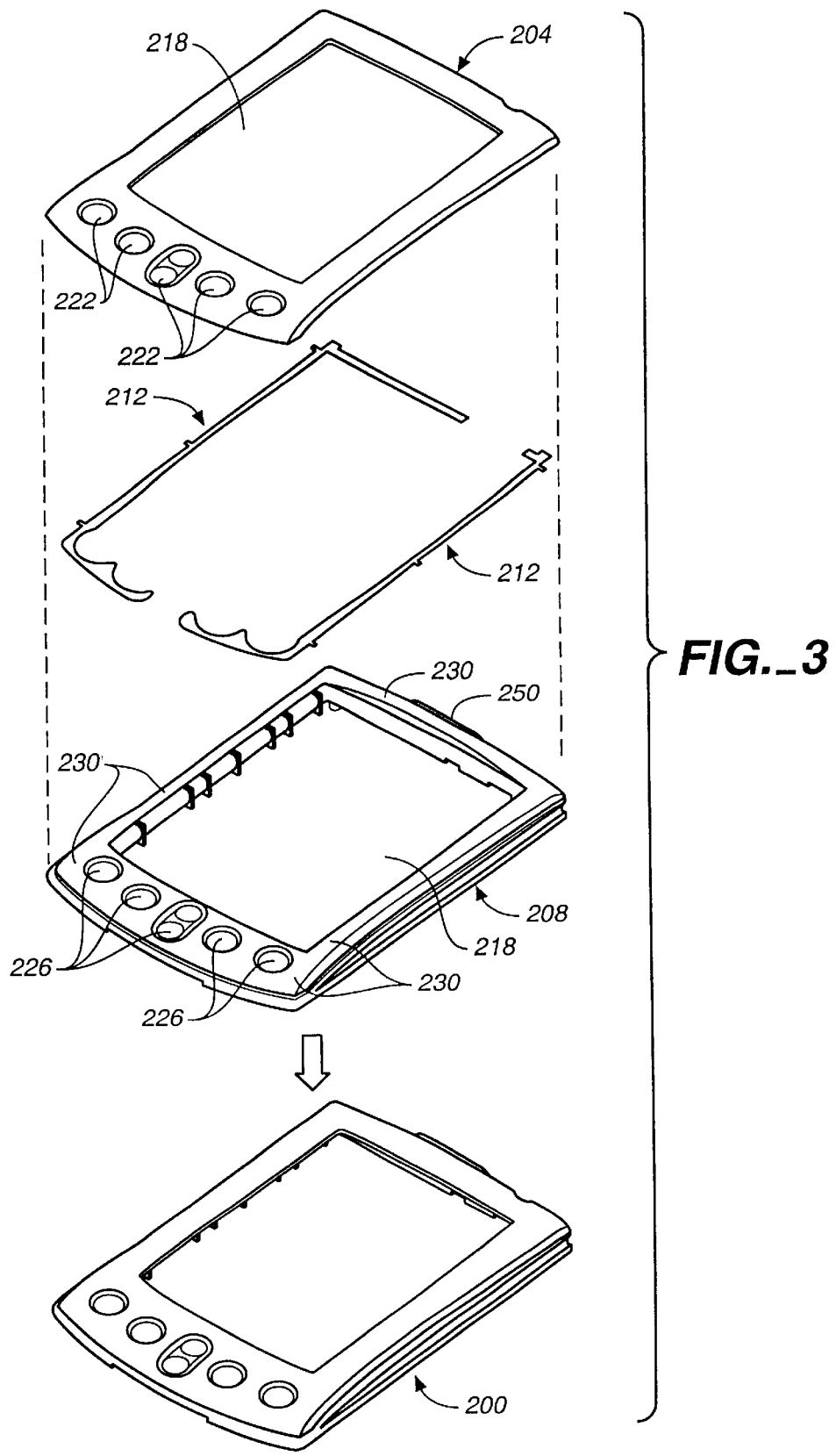
FIG._3

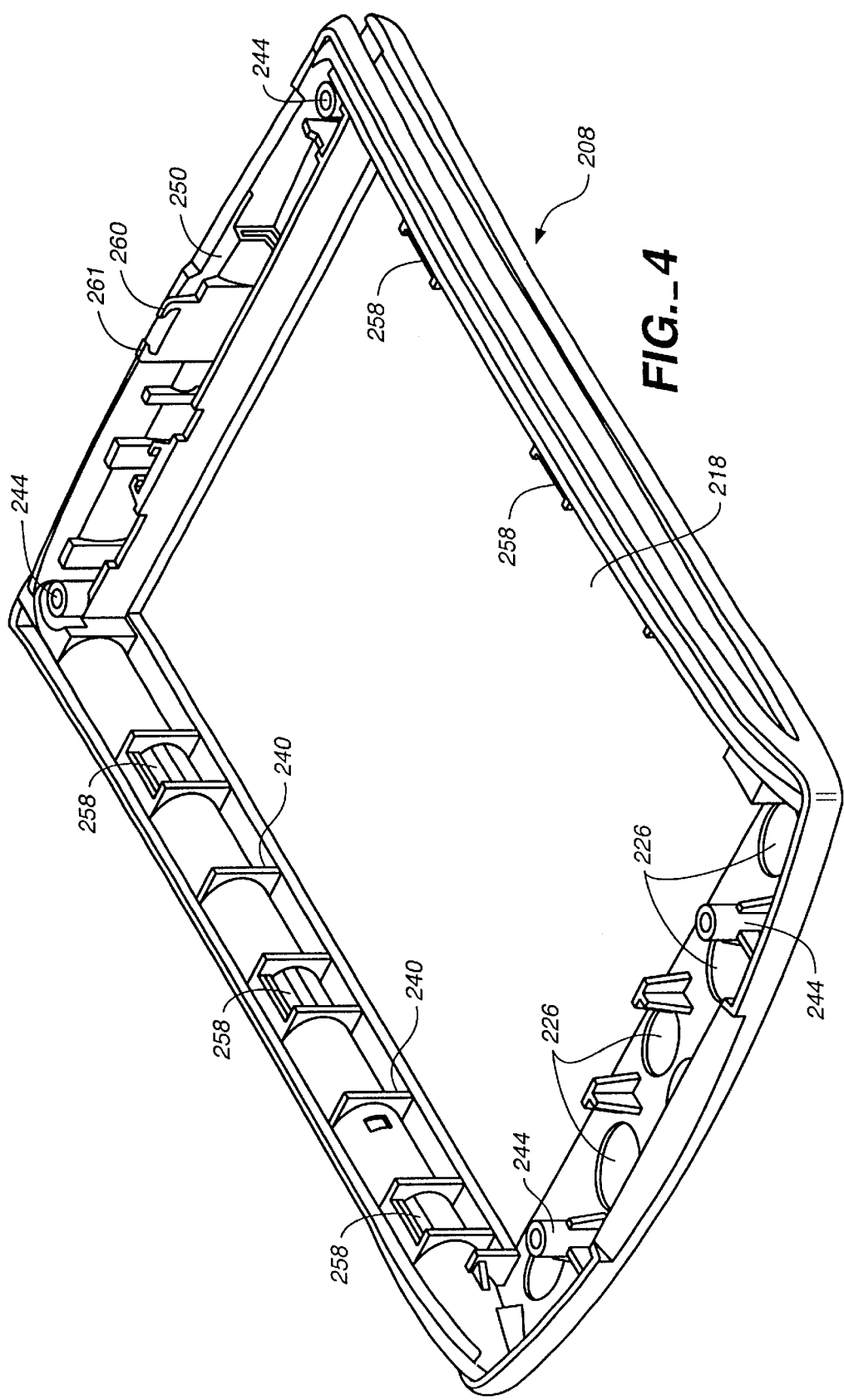
FIG._4

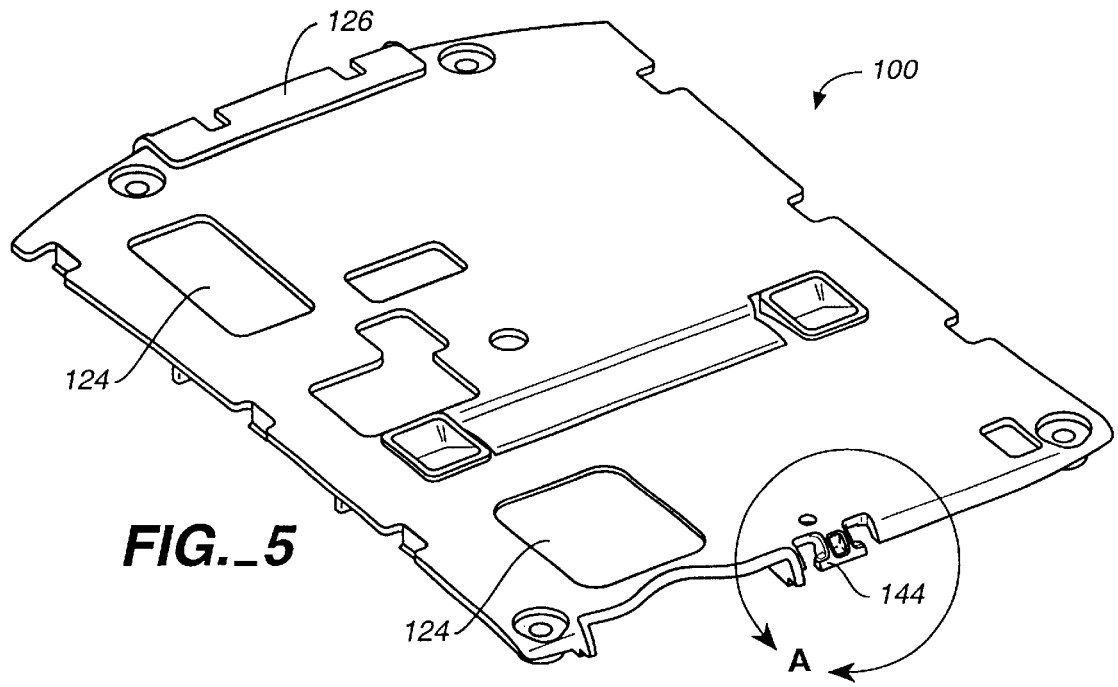
FIG._5
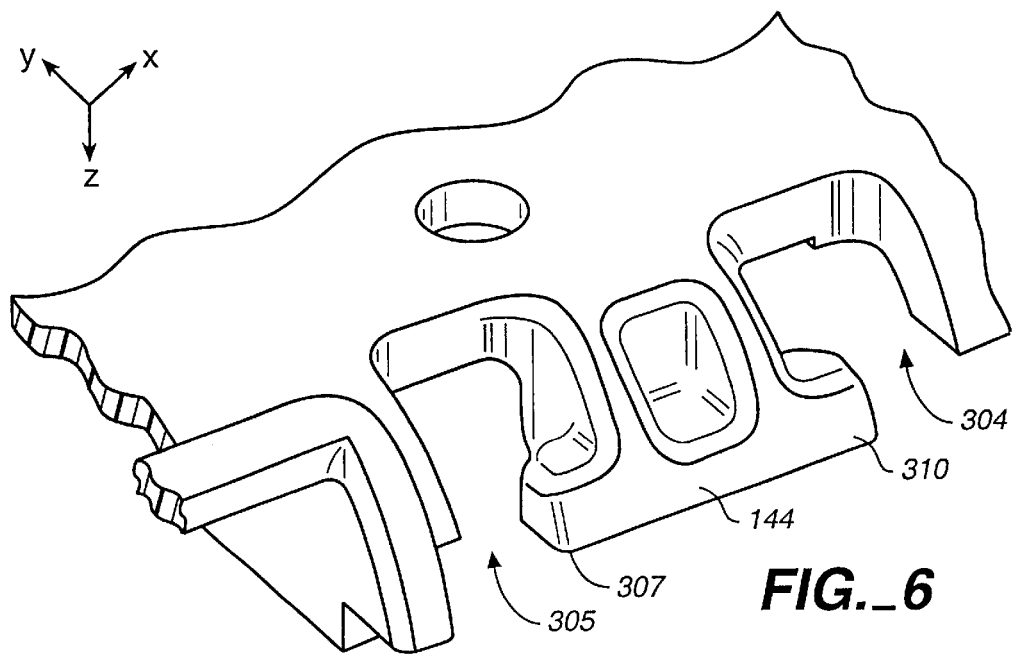
FIG._6

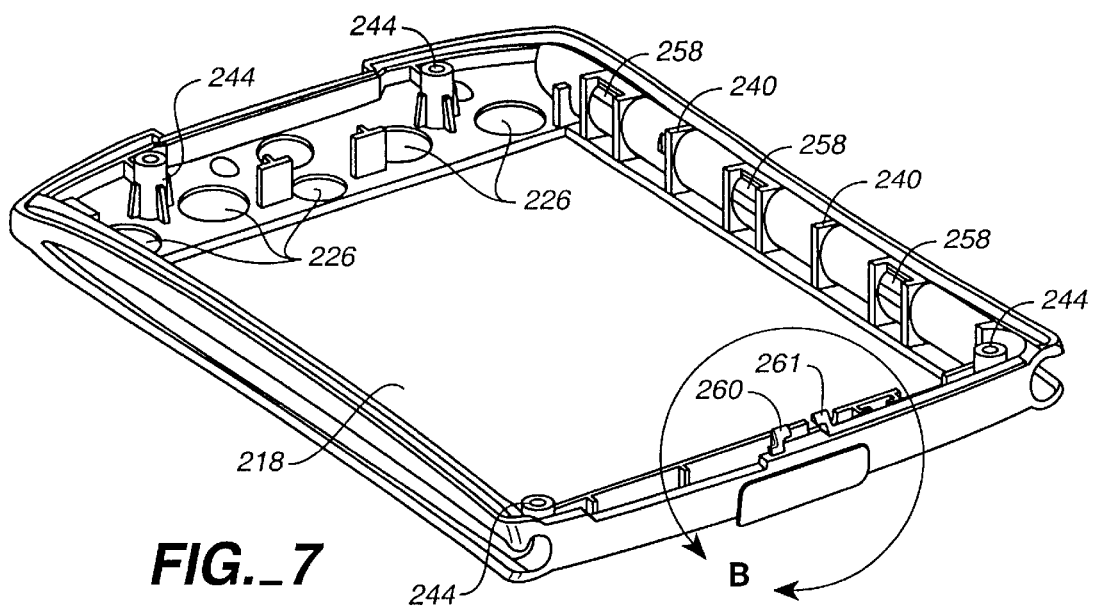
FIG._7
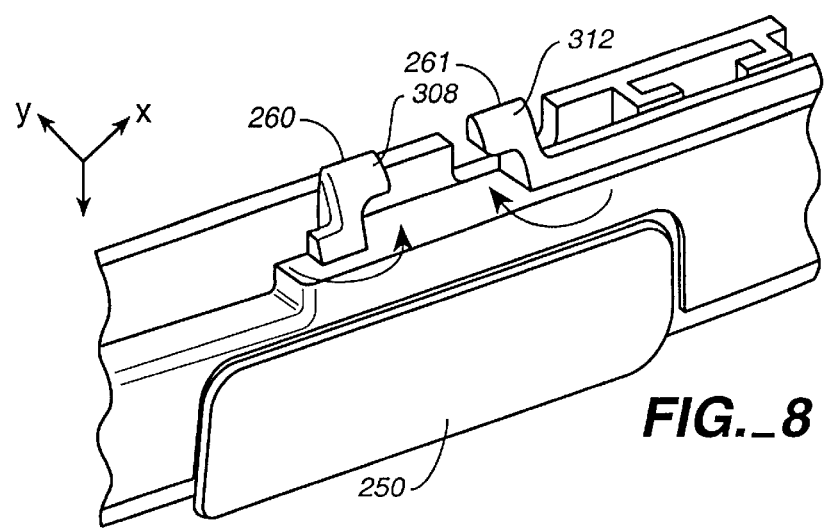
FIG._8
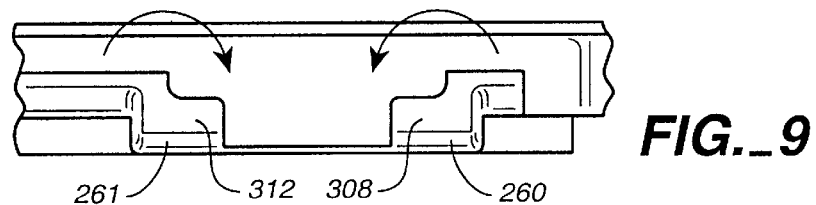
FIG._9

TORSIONAL MULTI-AXIS CONSTRAINING LATCHING SYSTEM

FIELD OF THE INVENTION

This invention relates generally to the field of housings for portable hand held devices. More particularly, this invention relates to a latching arrangement for latching together front and rear housing members of a palmtop computer.

BACKGROUND OF THE INVENTION

Portable hand held devices such palmtop computers have become widely accepted as personal and business organizational tools. As such, many users constantly carry such devices with them. Such constant use requires that the housing for such devices meet a number of criteria. The housing should be aesthetically appealing. Simultaneously, the housing should be very rugged to protect the inner electronics from damage, and thus should not come apart in the event of a drop. As such devices become more and more powerful, the need for strength in the housing and associated latching mechanism is at odds with the need to minimize the amount of volume occupied by the housing, and thus unavailable for packaging the electronics. Moreover, any latching mechanism used to hold the housing together should minimize any volume occupied and provide a secure latching system to prevent the disengagement of the housing parts.

SUMMARY OF THE INVENTION

The present invention relates generally to a latching mechanism for the housing of a portable hand held device such as a palmtop computer. Objects, advantages and features of the invention will become apparent to those skilled in the art upon consideration of the following detailed description of the invention.

In one embodiment consistent with the present invention a housing for a portable hand held device such as a palmtop computer uses a torsional latching system. The housing is made of front and rear housing laminated housing members. The torsional latch arrangement works in conjunction with a plurality of latch fingers along the edge to attach the front housing laminate with the rear housing laminate. The torsional latch arrangement has a pair of L-shaped latch ribs that engage with a T-shaped latch member by torsion of the L-shaped latch ribs into engagement with pockets adjacent the T-shaped latch member prevent movement of the two housing laminates in relation to one another. This latching arrangement provides the advantage of latching the two housing laminates together in a manner that impedes disengagement by forces encountered in a drop since the torsional forces required to disengage the latch are not encountered in a drop.

In one embodiment of the present invention, a latching arrangement for latching a first housing member to a second housing member includes a T-shaped latching member extending approximately perpendicular to a plane of the first housing member, the T-shaped latching member defining a first and a second void adjacent each side thereof beneath a top of the T-shape. A first L-shaped latch rib extends approximately perpendicular to a plane of the second housing member, and then turns near an end thereof to define the L-shape. A second L-shaped latch rib extends approximately perpendicular to the plane of the second housing member, and then turns near an end thereof to define the L-shape. The first and second L-shaped latch ribs are situated adjacent each other with their respective ends pointing toward each other, and each has a tapered surface on an edge thereof with the taper narrowing as the L-shape gets farther from the second housing member. The latching arrangement latches by the first and second L-shaped latch ribs twisting as their respective tapered surfaces slide over the T-shaped latching member until the ends of the L-shaped latch ribs slide past the top of the T-shaped latching member and engage the first and second voids adjacent the T-shaped latching member.

In another embodiment, a latching arrangement for latching a first housing member to a second housing member for a palmtop computer includes a T-shaped latching member extending approximately perpendicular to a plane of the first housing member, the T-shaped latching member defining a first and a second void adjacent each side thereof beneath a top of the T-shape. A first L-shaped latch rib extends approximately perpendicular to a plane of the second housing member, and then turns near an end thereof to define the L-shape. A second L-shaped latch rib extends approximately perpendicular to the plane of the second housing member, and then turns near an end thereof to define the L-shape. The first and second L-shaped latch ribs are situated adjacent each other with their respective ends pointing toward each other, and each having a tapered surface on an edge thereof with the taper narrowing as the L-shape gets farther from the second housing member. The latching arrangement latches by the first and second L-shaped latch ribs twisting as their respective tapered surfaces slide over the T-shaped latching member until the ends of the L-shaped latch ribs slide past the top of the T-shaped latching member and engage the first and second voids adjacent the T-shaped latching member. The first housing member includes a metal rear cover laminated with a plastic substrate, and the T-shaped latching member is molded as a part of the plastic substrate. The second housing member includes a plastic midframe laminated with a metal front cover.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 1 is an illustration of a rear housing laminate assembly and its components for a palmtop computer in accordance with an embodiment of the invention.

FIG. 2 is an illustration of the internal ribbing and support detail for the plastic substrate of FIG. 1.

FIG. 3 is a an illustration of a front housing laminate assembly and its components for a palmtop computer in accordance with an embodiment of the invention.

FIG. 4 is an illustration of the inside of the midframe showing the support and fastening detail.

FIG. 5 is an illustration of the plastic substrate of FIG. 2 from a different perspective that better illustrates detail A.

FIG. 6 shows detail A of FIG. 5.

FIG. 7 is an illustration of the midframe of FIG. 3 from a different perspective that better illustrates detail B.

FIG. 8 shows detail B of FIG. 7.

FIG. 9 is a top view of the L-shaped latch ribs indicating a direction of rotation during assembly.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Torsional Multi-axis Constraining Latching System in Accordance with the Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The present latching system is preferably, but not necessarily, used in conjunction with a laminated housing arrangement as described herein. The housing arrangement provides front and rear housing laminate assemblies that are made up of a metal outer member adhesively bonded with an internal plastic member. The laminated assemblies are then attached together by the present latching mechanism and mechanical fasteners to provide the finished housing. Before considering the details of the latching arrangement itself, first consider the preferred laminated housing arrangement.

Turning now to FIG. 1, the rear housing laminate assembly 100 is illustrated. The rear housing laminate assembly 100 is assembled from a stamped sheet metal rear outer housing member 104 and an injection molded plastic substrate 108. The metal rear housing member 104 is of substantially uniform thickness (e.g., 0.6 mm) and has an inner surface (not shown) that has a contour dictated by various functional and aesthetic considerations. Several openings may be provided in the metal rear housing member such as 112 through which the plastic of the substrate 108 protrudes when assembled at protuberances 114. Additionally, an opening 116 is provided in the bottom, in this embodiment, to provide access to electrical connections for charging, communication, etc.

The metal rear housing member 104 is bonded to a bonding surface 120 of the plastic substrate 108 using a suitable adhesive. In the preferred embodiment, the adhesive is a pressure sensitive adhesive (PSA) such as 3M 9495 pressure sensitive adhesive. This adhesive is die cut and shown as 118 to provide adhesive in the areas of the assembly where the bonding surface 120 conforms with the inner surface of the metal rear housing member 104. The two parts are bonded together by application of a suitable amount of pressure to cause the adhesive to fully bond. Those skilled in the art will appreciate that other adhesives may also be suitable.

In the present embodiment, the plastic substrate 108 has a thickness of approximately 1.2 mm (except in areas of ribbing, etc.). The thickness of the PSA is approximately 0.09 mm resulting in a total thickness of the rear housing laminate 100 of about 1.89 mm. This thickness provides strength approximately equivalent to a plastic single piece assembly in the range of 2.5–3.0 mm in thickness. Moreover, openings can be provided in areas such as 124 in the plastic substrate 108 to provide for larger components (reducing localized wall thickness to that of the metal rear housing member 104) without significantly degrading the strength of the rear housing laminate assembly 100.

Once bonded together, the plastic protuberances 114 show through openings 112 to enhance the aesthetics of the laminated assembly. In addition, a plastic area 126 of the plastic substrate 108 is revealed in the area of opening 116 in the metal rear housing member to prevent the user from being exposed to potentially sharp metal edges and to provide a margin of insulation above the electrical contacts revealed by opening 116.

The metal rear housing member 104 includes a plurality of countersunk openings 130 for accepting screws that pass through openings 132 in the plastic substrate so that rear housing laminate assembly 100 can be secured to the front housing laminate assembly. When the screws are passed through openings 130 and 132, the screw head rests against the metal within the countersink and therefore is able to securely hold both components 104 and 108 of the rear housing laminate assembly 100 in place.

The PSA adhesive selected provides an inexpensive bonding mechanism for the rear housing laminate assembly 100. A high degree of bond strength is not necessary for the rear housing laminate assembly 100 since the assembly 100 is held tightly together by the screws when mechanically fixed to the front housing laminate assembly.

With reference to FIG. 2, the inner surface of the plastic substrate 108 is shown to illustrate the presence of ribs 136 and other support structures used to further enhance the rigidity of the rear housing laminate assembly and provide for mechanical interface to internal components. The inner surface of plastic substrate 108 also includes a plurality of latch fingers 138. Latch fingers 138 are structured as walls protruding perpendicular to the surface of the plastic substrate 108. Each wall has a half arrow head shaped cross section at its end pointing in the direction of the wall with the trailing tip of the arrow head facing outward from the center of the housing. These latch fingers 138 are arranged in sets of three along each of two side edges of the plastic substrate 108. Also shown is a T-shaped latch member 144. The latch member 144 will be discussed later.

Referring now to FIG. 3, the front housing laminate assembly 200 is illustrated. The front housing laminate assembly 200 is produced by laminating a stamped sheet metal front cover 204 with an injection molded plastic midframe 208 using a die cut thermoplastic adhesive 212. In the present embodiment, an adhesive such as 3M 615 Thermobond™ is used to provide a high bond strength since the adhesive is the only thing holding the metal front cover 204 to the midframe 208. Other adhesives may also be suitable.

In the present application of a palmtop computer (such as those manufactured by Palm, Inc., the assignee of the present invention), the plastic midframe 208 and metal front cover 204 include a central opening 218 through which a display (e.g., an LCD display) is revealed in the final assembly. The metal front cover and the plastic midframe 208 also have a plurality of openings 222 and 226 through which various controls such as switches and buttons protrude to facilitate user control of the palmtop computer. Since the front surface of the device includes the large central opening 218 as well as openings 222 and 226, the surface area for adhesive bonding between the metal front cover 204 and the plastic midframe 208 is limited to a relatively small bonding area 230 surrounding the openings 218 and 226 on the midframe. Thus, in order to provide the required bond strength, a high bond strength adhesive such as the thermoplastic adhesive described above is used.

The plastic midframe 208 provides support for circuit board assemblies, the display and other electronics residing within the housing and therefore spans the thickness of the housing around the periphery of the housing. Due to this thickness, the midframe renders substantial support to the thin metal front cover 204 and provides overall rigidity to the front housing laminate assembly 200 over substantially the entire surface of the metal front cover 204, in this embodiment.

FIG. 4 shows the underside of the midframe 208. A plurality of ribs 240 are provided in the midframe 208 to enhance strength while minimizing material and thus weight and volume. A latch arrangement, as will be described later, is provided in the underside of the midframe 208 to permit it to latch with a mating assembly of the rear plastic substrate 108. The relatively thick midframe 208 is also molded with screw bosses at 244 to accept screws that pass through openings 130 and 132 of the rear housing laminate assembly to secure the front and rear together once mated together by the latch assembly. Once latched and screwed together, the overall housing assembly provides a rigid structure for housing the palmtop computer. The assembly is much more rigid than could have been provided by use of either plastic or metal alone and has the advantages of providing electromagnetic shielding and electrostatic discharge protection in a thin, light, easily serviced housing with a high level of cosmetic quality With a metallic feel and an elegant user interface. An infrared lens 250 is molded into midframe 208 for use in infrared communication between the palmtop computer and the outside world. A pair of L-shaped flexing latch ribs 260 and 261 appear at the top edge of the inside edge of midframe 208. Also, a plurality of latch receiving pockets 258 reside along the edges of midframe 208.

Referring to FIG. 5 taken together with FIG. 6, a detail taken from FIG. 5, another perspective of the rear housing laminate assembly 100, is shown in larger scale in FIG. 6. This detail A shows the T-shaped latch member 144 forming a part of the rear housing laminate assembly 100 (molded into housing 104) and rising approximately perpendicular to the plane of the substrate. (The plane of the substrate will define an X and Y direction with the T-shaped latch member extending inward therefrom in approximately the Z direction.) Adjacent each side of the T-shaped latch member 144 are voids defining a pair of pockets 304 and 305 that reside under the top portion of the T-shape. Referring to FIG. 7 taken together with FIG. 8, a detail taken from FIG. 7, another perspective of the front housing laminate assembly 200, is shown in larger scale in FIG. 8. This detail B shows the L-shaped latch ribs 260 and 261 forming a part of the front housing laminate assembly 200. The L shaped latch ribs extend first inward toward the rear housing laminate assembly 200 and away from the midframe in the Z axis, and then turn in opposing directions so that their ends are pointing toward each other. (The terms inward and outward as used herein are with reference to the overall housing itself.) The L-shaped latch ribs 260 and 261 are tapered with the widest portion of the taper being at the midframe and the narrowest point being the farthest away from the midframe. The L-shaped latch ribs 260 and 261 taper. While this specific size and taper is not to be considered limiting, in conjunction with the material selection, the L-shaped latch ribs should be able to withstand repeated torsional forces adequate to engage and disengage without failure of the L-shaped latch ribs.

The rear housing laminate assembly and associated T-shaped latch member are made of a plastic material such as GE Cycoloy™ 6800 (a blend of polycarbonate and ABS plastics). The front housing laminate assembly and associated L-shaped latch ribs are made of a plastic such as GE Lexan™ 141. Of course, all materials disclosed herein are intended to be exemplary and not limiting.

When the front housing laminate assembly 200 is assembled to the rear housing laminate assembly 100, latch fingers 138 are aligned with and snapped into engagement with latch receiving pockets 158 by flexing the latch fingers 138 inward (toward the center of the housing) until they snap into the latch receiving pockets 158, in the manner of conventional plastic snap latches. Simultaneously, the L-shaped latch ribs 260 and 261 are pressed against the T-shaped latch member and flexed as illustrated in FIG. 8 and the top view of FIG. 9 until they pass the T-shaped latch member and drop into engagement within the pockets 304 and 305. The two housing members 100 and 200 can be disassembled by pulling from the bottom of the housing.

More specifically, the L-shaped latch rib 260 flexes and rotates counterclockwise during engagement as it is pressed into engagement with the mating side 307 of T-shaped latch member 144. During this process, the tapered surface 308 of L-shaped latch rib 260 slides against portion 307 of the rigid T-shaped latch member 144 causing it to rotate in the direction of the arrow until the L-shaped latch rib 260 slips into engagement into pocket 305. In a similar manner, the L-shaped latch rib 261 flexes and rotates clockwise during engagement as it is pressed into engagement with the mating side 310 of rigid T-shaped latch member 144. During this process, the tapered surface 312 of L-shaped latch rib 260 slides against portion 310 of the rigid T-shaped latch member 144 causing it to rotate in the direction of the arrow until the L-shaped latch rib 261 slips into engagement into pocket 304.

Once the L-shaped latch ribs 260 and 261 are engaged within pockets 305 and 304 respectively, any lateral shift between the front and rear housing laminates 200 and 100 respectively is inhibited by contact of the L-shaped latch ribs 260 and 261 with the walls of the pockets 305 and 304. Ribs 260 and 261 will resist disengagement since a rotation of the L-shaped ribs is required for disengagement.

In the preferred embodiment, the T-shaped latch member has thickness within the nominal wall thickness of the substrate 108 and follows the overall contours of the internal and external surfaces of the substrate 108. The two L-shaped latch ribs 260 and 261 are also within the nominal wall thickness and their contour matches the curvature of the T-shaped latch member 144. This minimizes the amount of housing volume used by the latching system.

Since there is an L-shaped latch rib engaged on each side of the T-shaped latch member 144, the engagement between the two housing laminates is essentially doubled to significantly increase the strength of the latching system in the Z direction while simultaneously constraining movement in the X direction.

Once the front and rear housing laminates are assembled, the housing is further strengthened by installation of screws through holes 130 and 132 which are threaded into bosses 244 of the midframe 208. This secures the metal rear housing member 104 to the midframe 208 and securely sandwiches the substrate 108 therebetween to minimize any gap between the rear housing laminate 100 and the midframe 208. In the preferred embodiment, the midframe 208 and substrate 108 are made of black plastic which provides an aesthetic contrast to a silver colored metal used for the metal front cover 204 and metal rear housing member 104. Along all edges, the midframe is exposed to provide a contrasting color arrangement of black and silver. Additionally, at any area where access to the inside of the cover is provided (e.g., adjacent 116), the black plastic is advantageously used to provide a black border around the metal. This provides an aesthetic tool as well as a tool that is used to cover the metal edges of the cover 204 and housing member 104 to avoid sharp metal edges.

The L-shaped latch ribs 260 and 261 behave in a torsional manner during deflection and thus dramatically reduces the possibility of disengagement during impact. This is because there is no force applied to the L-shaped latch ribs 260 and 261 which would cause torque to be applied to them as is required to disengage them from pockets 305 and 304. This is in contrast to traditional snaps that behave as a simple cantilever during impact and relatively easily disengage due to the shift of one housing member in relation with the other. The combination of the conventional plastic snap latches 138 engaged in pockets 258 with the L-shaped latch rib engaged with the T-shaped latch member 144 of the present invention constrains the front housing laminate 200 in relation to the rear housing laminate 100 in five axes and all three rotational directions. Thus, the present latching arrangement resists shifting of the housing members in relation to one another on impact with a compact design. While the invention has described the latching arrangement in conjunction with a laminated housing, this should not be considered limiting.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A latching arrangement for latching a first housing member to a second housing member, comprising:
   a T-shaped latching member extending approximately perpendicular to a plane of the first housing member, the T-shaped latching member defining a first and a second void adjacent each side thereof beneath a top of the T-shape;
   a first L-shaped latch rib extending approximately perpendicular to a plane of the second housing member, and then turning near an end thereof to define the L-shape;
   a second L-shaped latch rib extending approximately perpendicular to the plane of the second housing member, and then turning near an end thereof to define the L-shape;
   the first and second L-shaped latch ribs situated adjacent each other with their respective ends pointing toward each other, and each having a tapered surface on an edge thereof with the taper narrowing as the L-shape gets farther from the second housing member; and
   wherein, the latching arrangement latches by the first and second L-shaped latch ribs twisting as their respective tapered surfaces slide over the T-shaped latching member until the ends of the L-shaped latch ribs slide past the top of the T-shaped latching member and engage the first and second voids adjacent the T-shaped latching member.

2. The apparatus according to claim 1, wherein the first housing member comprises a metal rear cover laminated with a plastic substrate, and wherein the T-shaped latching member is molded as a part of the plastic substrate.

3. The apparatus according to claim 2, wherein the plastic substrate is injection molded from a blend of polycarbonate and ABS plastic.

4. The apparatus according to claim 2, wherein the metal rear cover is laminated to the plastic substrate using a pressure sensitive adhesive.

5. The apparatus according to claim 1, wherein the second housing member comprises a plastic midframe laminated with a metal front cover.

6. The apparatus according to claim 5, wherein the plastic midframe is injection molded from Lexan™ plastic.

7. The apparatus according to claim 5, wherein the metal front cover is laminated to the plastic midframe using a thermoplastic adhesive.

8. The apparatus according to claim 1, wherein the T-shaped latching member is injection molded from a blend of polycarbonate and ABS plastic.

9. The apparatus according to claim 1, wherein the L-shaped latching ribs are injection molded from Lexan™ plastic.

10. The apparatus according to claim 1, further comprising a plurality of plastic snap latches distributed about a periphery of the housing.

11. A latching arrangement for latching a first housing member to a second housing member for a palmtop computer, comprising:
    a T-shaped latching member extending approximately perpendicular to a plane of the first housing member, the T-shaped latching member defining a first and a second void adjacent each side thereof beneath a top of the T-shape;
    a first L-shaped latch rib extending approximately perpendicular to a plane of the second housing member, and then turning near an end thereof to define the L-shape;
    a second L-shaped latch rib extending approximately perpendicular to the plane of the second housing member, and then turning near an end thereof to define the L-shape;
    the first and second L-shaped latch ribs situated adjacent each other with their respective ends pointing toward each other, and each having a tapered surface on an edge thereof with the taper narrowing as the L-shape gets farther from the second housing member;
    wherein the latching arrangement latches by the first and second L-shaped latch ribs twisting as their respective tapered surfaces slide over the T-shaped latching member until the ends of the L-shaped latch ribs slide past the top of the T-shaped latching member and engage the first and second voids adjacent the T-shaped latching member;
    wherein the first housing member comprises a metal rear cover laminated with a plastic substrate, and wherein the T-shaped latching member is molded as a part of the plastic substrate; and
    wherein the second housing member comprises a plastic midframe laminated with a metal front cover.

12. The apparatus according to claim 11, wherein the plastic substrate is injection molded from a blend of polycarbonate and ABS plastic.

13. The apparatus according to claim 11, wherein the metal rear cover is laminated to the plastic substrate using a pressure sensitive adhesive.

14. The apparatus according to claim 11, wherein the plastic midframe is injection molded from Lexan™ plastic.

15. The apparatus according to claim 11, wherein the metal front cover is laminated to the plastic midframe using a thermoplastic adhesive.

16. The apparatus according to claim 11, wherein the T-shaped latching member is injection molded from a blend of polycarbonate and ABS plastic.

17. The apparatus according to claim 11, wherein the L-shaped latching ribs are injection molded from Lexan™ plastic.

18. The apparatus according to claim 11, further comprising a plurality of plastic snap latches distributed about a periphery of the housing.

* * * * *